United States Patent
Fisher (10) Patent No.: US 8,789,619 B2
(45) Date of Patent: Jul. 29, 2014

(54) CAM ACTUATED PERSUSSIVE TOOL

(76) Inventor: Hugh Edward Fisher, Dalrymple (GB)

( * ) Notice: Subject to any disclaimer, the term of this patent is extended or adjusted under 35 U.S.C. 154(b) by 42 days.

(21) Appl. No.: 12/443,884

(22) PCT Filed: Jun. 20, 2008

(86) PCT No.: PCT/GB2008/002108
§ 371 (c)(1),
(2), (4) Date: Aug. 12, 2009

(87) PCT Pub. No.: WO2009/004287
PCT Pub. Date: Jan. 8, 2009

(65) Prior Publication Data
US 2010/0089603 A1    Apr. 15, 2010

(30) Foreign Application Priority Data

Jun. 29, 2007 (GB) .................................. 0712557.8

(51) Int. Cl.
*B25D 11/08* (2006.01)
*B25D 11/00* (2006.01)
*F16H 25/12* (2006.01)

(52) U.S. Cl.
CPC ............... *F16H 25/12* (2013.01); *B25D 11/08* (2013.01); *B25D 2250/275* (2013.01); *B25D 11/005* (2013.01)
USPC ........... 173/205; 173/117; 173/124; 173/217; 30/272.1; 30/392

(58) Field of Classification Search
CPC ...... B25D 11/00; B25D 11/102; B25D 11/08; B25D 11/10; B25D 15/00; B25D 15/02; B25D 16/00; B25D 16/008; B25D 17/00
USPC ............. 173/90, 100, 94, 109, 112, 114, 117, 173/122, 205, 171, 217, 110; 30/167, 30/272.1, 329, 392
See application file for complete search history.

(56) References Cited

U.S. PATENT DOCUMENTS

| 1,491,409 A | 4/1924 | Lee | |
| 2,436,692 A * | 2/1948 | Greene | ............................. 74/57 |

(Continued)

FOREIGN PATENT DOCUMENTS

| EP | 1209381 A2 | 5/2002 |
| GB | 2219958 | 12/1989 |

(Continued)

OTHER PUBLICATIONS

Office Action from corresponding European Application No. 087624250.0-1262 dated Nov. 12, 2012; 7 pgs.

(Continued)

*Primary Examiner* — Scott A. Smith
(74) *Attorney, Agent, or Firm* — Gifford, Krass, Sprinkle, Anderson & Citkowski, P.C.

(57) ABSTRACT

There is disclosed a tool (5) comprising a cam track (A) and cam follower means (B), wherein a width (WA) of at least a portion of the cam track (A) is greater than a width (WB) of the cam follower means (B). The cam follower means (B) is engaged within the cam track (A), the cam follower means (B) being adapted to run in/around the cam track (A) and be thrown between opposing walls (D, E) of the cam track (A). In use, the cam follower means (B) therefore has two degrees of motion, a first defined by the cam track (A), and a second defined by ricochet between opposing walls (D, E).

39 Claims, 5 Drawing Sheets

(56) References Cited

U.S. PATENT DOCUMENTS

| | | | |
|---|---|---|---|
| 2,969,692 A | | 1/1961 | Pfarrwaller |
| 2,970,483 A | | 2/1961 | Schrum |
| 3,049,803 A | * | 8/1962 | Danger .......................... 30/228 |
| 4,300,406 A | | 11/1981 | Negro et al. |
| 5,427,188 A | * | 6/1995 | Fisher .......................... 173/205 |
| 5,513,709 A | * | 5/1996 | Fisher .......................... 173/205 |
| 6,199,640 B1 | * | 3/2001 | Hecht ............................ 173/48 |
| 6,751,875 B2 | * | 6/2004 | Jones ............................ 30/392 |
| 2003/0106177 A1 | * | 6/2003 | Fisher .......................... 15/93.1 |
| 2004/0035595 A1 | * | 2/2004 | Fisher .......................... 173/205 |

FOREIGN PATENT DOCUMENTS

| | | |
|---|---|---|
| JP | 59121248 | 7/1984 |
| JP | 2002-130427 A | 5/2002 |
| NL | 7002126 | 8/1971 |
| WO | 9311910 | 6/1993 |
| WO | 0160564 | 8/2001 |
| WO | 0214028 | 2/2002 |

OTHER PUBLICATIONS

Japanese Office Action (English translation attached), Nov. 21, 2012, 4 pages.

New Zealand Examination Report, Nov. 9, 2012, 2 pages.

Chinese Office Action (English translation only), Jun. 20, 2012, 5 pages.

Australian Examiner's First Report, Dec. 2, 2011, 2 pages.

* cited by examiner

CAM ACTUATED PERSUSSIVE TOOL

CROSS-REFERENCE TO RELATED APPLICATIONS

This application is the U.S. national phase of PCT/GB2008/002108 filed Jun. 20, 2000, which claims priority of Great Britain Patent Application 0712557.8 filed Jun. 29, 2007.

FIELD OF INVENTION

This invention is concerned with improvements in and relating to tools. The invention also relates to cam operated devices or cam operated power tools, and more particularly, though not exclusively, to tools or power tools with reciprocating tool bits driven by rotary drive means. The invention is also concerned with power tools, particularly, though not exclusively, relatively lightweight or handheld power tools, e.g. for the do-it-yourself (DIY), professional/trade markets and for maritime markets. The invention is also concerned with downhole tools, e.g. for use in drilling of wells or boreholes.

BACKGROUND TO INVENTION

A number of types of reciprocating power tools are in use for various tasks, e.g. scrapers, saws, hammers or the like. Commonly such tools are hydraulically or pneumatically powered; however, such powering necessitates use of a noisy and bulky compressor or the like in conjunction with the tool itself, resulting in a limited range of utility for such tools. Further, such tools cannot easily or efficiently attain high speeds of reciprocation.

An alternative arrangement is to convert rotary movement provided by, for example, an electric motor into reciprocating movement of the tool bit. One means for achieving this conversion is to use the motor to drive the rotation of a cam bearing a cam track, and to provide the tool bit with a pair of cam followers, which are a close fit within the cam track. As the cam rotates the cam followers are driven forward and backward along the cam track, which is typically a sinusoidal cam track, so driving the tool bit forward and backward. Such arrangements are described in GB 2 219 958 A and WO 93/11910 by the same Inventor, the contents of which are incorporated herein by reference.

WO 01/60564 also by the same Inventor, the content of which is incorporated herein by reference, discloses a portable power tool, such as a hand-held marine growth removal scraper tool comprising a housing, a drive means and a mounting arrangement for a tool bit, wherein there is provided within the housing an output arrangement adapted to drive an output shaft in a reciprocal axial movement to drive the tool bit, and wherein the drive means is substantially sealed from external of the tool.

WO 02/14028 also by the same Inventor, the content of which is incorporated herein by reference, discloses a power tool comprising a housing, a rotary drive means, a cylinder cam having a cam track extending around a circumferential surface thereof, cam follower means adapted to run in said cam track, and a mounting arrangement for a tool bit, one of the cam and the cam follower means being driven by the drive means, and the mounting arrangement being associated with one of the cam and the cam follower means, such that actuation of the rotary drive means drives reciprocal movement of the mounting arrangement; and wherein at least part of the cam track is in the form of a wave having an amplitude and a wavelength, the wave providing a forward throw section and a rearward throw section which in use drive the mounting arrangement respectively forward and rearward, at least one of the forward throw section or rearward throw section imparting a greater forward or rearward acceleration respectively to the mounting arrangement than that imparted by a sinusoidal cam track of equivalent amplitude and wavelength.

A number of problems have been identified in the prior art. For example, when a tool is operated in particularly robust uses, e.g. marine hull scraping, it has been found desirable to seek to provide an improved tool. This is required in order to seek to ensure appropriate efficient functionality of the tool, e.g. removal of marine debris or encrustations, preferably without damaging the underlying substrate, e.g. hull.

Another problem is in relation to the amount of input power required for tools of the prior art to work effectively, if at all.

It is an object of at least one embodiment of at least one aspect of the present invention to obviate or at least mitigate one or more problems and/or disadvantages in the prior art.

It is an object of at least one embodiment of at least one aspect of the present invention to provide an improved tool, e.g. a power tool, hand-held power tool, and/or scraper tool, e.g. marine anti-fouling tool.

It is an object of at least one embodiment of at lest one aspect of the present invention to provide an improved tool which uses less power than prior art tools, e.g. of the order of 10 to 60 watts, e.g. typically around 20 to 25 watts for non-professional and for hand-held versions and typically around 40 to 50 watts for professional or commercial versions.

SUMMARY OF INVENTION

According to a first aspect of the present invention there is provided a tool comprising at least one cam track and at least one cam follower means, wherein a width of at least a portion of the at least one cam tracks is greater than a width of the respective at least one cam follower means.

The cam follower means and cam track are therefore a loose fit relative to one another. This is in contradistinction to the prior art wherein the cam follower means was a close or tight fit within the cam track. Preferably the cam track and cam follower means are engaged with one another, e.g. one within the other.

Preferably the cam follower means is engaged within, or located in the cam track.

The cam follower means may be adapted to run in the cam track, e.g. move around the cam track and be thrown between opposing walls of the cam track.

The width of the cam follower means may be less than 90%, 80%, 70%, 60%, or 50% of the width of the at least a portion of the cam track.

The width of the cam follower means may be in the region of 10% to 90%, or 40% to 80% of the width of the at least a portion of the cam track.

In use, when not placed against a work surface (unloaded), the cam follower means may follow a path dictated substantially only by the cam track.

The cam track and cam follower means may be such that, in use, when not placed against a work surface the cam follower means travels in a substantially straight path from one trough on one wall of the cam track to another trough on another wall of the cam track, preferably without intermediately striking the walls of the track.

In use, when placed against a work surface (loaded), the cam follower means may follow a path dictated by the cam track and by ricochet of the tool off the work surface and/or the cam follower means off walls of the cam track.

In the latter case the cam follower means therefore has two degrees of motion, a first degree of motion defined by the cam track, and a second degree of motion defined by ricochet between opposing walls of the cam track.

The first degree of motion may have a frequency defined by the cam track.

The second degree of motion may have a higher frequency than the frequency of the first degree of motion. The frequency of the second degree of motion may vary dependent upon the work surface to which the tool is presented.

The first degree of motion may cause a substantially longitudinally throw of a tool bit of the tool.

The second degree of motion may cause a substantially longitudinal vibration or chatter of the tool bit of the tool.

The width of the cam follower means may be less than the width of the entire cam track.

The cam track may comprise a closed (circular) track, and may be provided on a cam cylinder.

The cam follower means may comprise at least one pin, and preferably at least one pair of opposing pins.

Sides or walls of the cam track may be substantially parallel or alternatively non-parallel.

The width of the cam track may be constant or may vary around the length thereof.

In a first embodiment the width of the cam track is substantially constant along or around the length thereof.

In a second embodiment the width of the cam track is greater at a portion adjacent peaks and/or troughs than at a portion of the cam track between the peaks and troughs.

Preferably the cam track may be recessed, and the cam follower means received therein. Alternatively the cam follower means may be recessed or comprise at least first and second spaced members or portions (e.g. upstanding members or portions), and the cam track received therein or therebetween. In the latter case there may be provided at least two pairs of opposing first and second members.

The cam track may comprise a waveform, e.g. sinusoidal or non-sinusoidal.

Peaks and/or troughs of a first cam track wall may be coincident with or offset from peaks and/or troughs of a second cam track wall.

The tool may advantageously be a power tool or hand-held tool, e.g. a hand-held power tool.

Advantageously the tool may be powered by an external electrical supply, e.g. mains electricity (e.g. 110V/240V) or by a low voltage supply (e.g. 12V), e.g. from a motor vehicle or vessel/boat. Alternatively, advantageously, the tool may be battery powered e.g. by a battery pack.

Alternatively, the tool may be hydraulically powered.

Alternatively, the tool may be pneumatically powered, e.g. by compressed air.

The cam track or the cam follower means may be rotationally driven by rotational drive means, e.g. advantageously an electric motor or alternatively a hydraulic or pneumatic motor.

In a particularly advantageous embodiment the tool may comprise a marine growth removal or anti-fouling tool, e.g. barnacle scraper or hull scraper.

The tool may comprise at least one tool bit or head operatively connected to one of the at least one cam track and the at least one cam follower means.

The tool may further comprise at least rotational drive means operatively connected to the other of the at least one cam track and the at least one cam follower means.

The tool may comprise, e.g. in said particularly advantageous embodiment, a housing, a drive means and a mounting arrangement for a tool bit, wherein there is provided within the housing an output arrangement adapted to drive an output shaft in a reciprocal axial movement to drive the tool bit, and the drive means may be substantially sealed (e.g. against fluid ingress) from external of the tool. This arrangement allows the tool to be used underwater or in wet/moist environments.

In alternative advantageous embodiments the tool may comprise a handyman's or tradesman's tool.

The tool may comprise a scraper, paint stripper, wall paper stripper, chisel, cold chisel, power spade, hammer or the like.

In a further alternative embodiment the tool may comprise at least first cam follower means and at least one further cam follower means.

In such case the tool may comprise a first respective tool bit or head, e.g. connected to the at least first cam follower means, e.g. by means of a respective connection means such as a shaft.

In such case the tool may comprise at least one further respective tool bit or head, e.g. connected to the one of the at least one further cam follower means, e.g. by way of respective cam follower means such as a shaft.

In one version of the alternative embodiment the at least first cam follower means and at least one of the at least one further cam follower means may be associated with (e.g. in use, run around) the one of the at least one of the cam tracks.

In another version of the alternative embodiment the at least first cam follower means may be associated with one of the at least one cam tracks and at least one of the at least one further cam follower means is associated with another of the at least one cam tracks.

In the one version and the another version the at least one cam follower means and the at least one further cam follower means may be substantially the same, though, e.g. provided rotationally separate from one another. In this way the at least one cam follower means and further at least one cam follower means may, in use, impart substantially the same movement to a respective tool bit and further tool bit, though, e.g. out of phase with one another, e.g. 90° or 180° out of phase.

Alternatively in the one version and the another version the at least one cam follower means and the at least one further cam follower means may be different, e.g. in size, though, e.g. provided rotationally separate from one another. In this way the at least one cam follower means and further at least one cam follower means may, in use, impart different movements to a respective tool bit and further tool bit. By such arrangement, in use, the tool bit may impact or work upon a work surface in one way and the further tool bit impact or work upon the work surface in another way.

In the another version the at least one cam track and the another at least one cam track may be substantially the same though optionally out of phase with one another. The at least one cam follower means and at least one further cam follower means may be rotationally separate or coincident. By such arrangement, in use, a tool bit of the at least one cam follower means and tool bit of the at least one further cam follower means may be caused to move in a same fashion or manner though, e.g. out of phase with one another.

In the another version the at least one cam track and the another at least one cam track may be substantially different. The at least one cam follower means and at least one further cam follower means may be rotationally separate or coincident. Further the at least one cam track and the another at least one cam track and the another at least one cam track may be in phase or out of phase with one another. By such arrangement, in use, a tool bit of the at least one cam follower means and tool bit of the at least one further cam follower means may be caused to move in a different fashion or manner, whether out of phase or in phase with one another.

The tool may comprise a downhole tool.

The tool may comprise one or more of:

a housing;

a rotary drive means, e.g. electric motor;

a cylinder cam having the cam track extending around a circumferential surface thereof;

a mounting arrangement for (releasably holding) a tool bit, one of the cam track and cam follower means being driven by the drive means;

the mounting arrangement being associated with one of the cam track and the cam follower means, such that actuation of the rotary drive means drives reciprocal movement of the mounting arrangement;

at least part of the cam track being in the form of a wave having an amplitude and a wavelength, the wave having a forward throw section, and a rearward throw section, which, in use, drive the mounting arrangement respectively forward and rearward.

There may be provided a plurality of interchangeable tool bits or heads.

According to a second aspect of the present invention there is provided a tool comprising a cam track and cam follower means, wherein, in use, the cam follower means has a first degree of motion dictated by the motion around the cam track, and a second degree of motion dictated by motion between walls of the cam track.

The features of the first aspect of the invention hereinbefore recited may be provided in the tool of the second aspect either alone or in combination, with or without the features of the first aspect, which features are not recited hereinagain in full merely for reasons of conciseness.

BRIEF DESCRIPTION OF DRAWINGS

Embodiments of the invention will now be described by way of example only, and with reference to the accompanying drawings, which are:

FIG. 9($a$) one version of a further alternative cam track and cam follower arrangement according to a further embodiment of the present invention; and FIG. 9($b$) another version of the further alternative cam track and cam follower arrangement according to the further embodiment of the present invention.

DETAILED DESCRIPTION OF DRAWINGS

Figure 1:
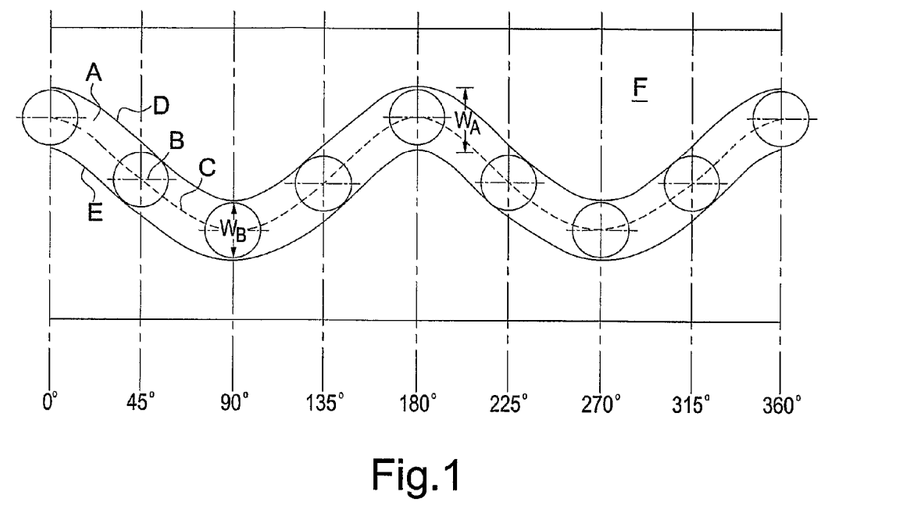
FIG. 1 a cam track and cam follower arrangement of a tool according to the prior art.

Referring initially to FIG. 1, there is shown a cam track A and cam follower means B arrangement of a tool according to the prior art. This arrangement is disclosed in the prior art by the same Inventor hereinbefore mentioned.

As can be seen from FIG. 1, the cam follower means B is a snug fit in the cam track A, a width $W_B$ of the cam follower means B being substantially the same as the width $W_A$ of the cam track A, such that there is little or no play between the cam follower means B and the cam track A. Thus, in use, the cam follower means B follows the track C shown, having only one degree of freedom of movement. The cam track has walls D, E. Although a tool according to the prior art providing such an arrangement was found to be an improvement over the art, further improvement is desirable, particularly in using such a tool in robust uses, e.g. as a marine scraper.

FIG. 1 shows a parallel sided cam track A or wave or cam slot cut around a revolving cam drum F. The circular cam follower means B shown engaging the cam track A are near the same in diameter as the width of the cam track A. When the cam drum F revolves, the cam follower means B follows the wave shape precisely as there is no other alternative open to them. The track or path C is shown in FIG. 1 by a dotted line central to the width of the cam track A.

Referring now to FIGS. 2 to 5, there is shown a tool, generally designated 5, according to an embodiment of the present invention having a cam track A and cam follower B arrangement.

The tool 5 comprises cam track A and cam follower means B adapted to run in the cam track A, wherein a width $W_A$ of at least a portion of the cam track A is greater than a width $W_B$ of the cam follower means B.

The cam follower means B is, therefore, a loose fit within the cam track A. This is in contradistinction to the prior art, as exemplified in FIG. 1, wherein the cam follower means B was a tight fit within the cam track A. The cam follower means B is adapted to run in and around the cam track A.

The width of the cam follower means B is typically selected to be less than 90%, 80%, or preferably less than or around 70%, 60%, or 50% of the width of the at least a portion of the cam track A.

Figure 4:
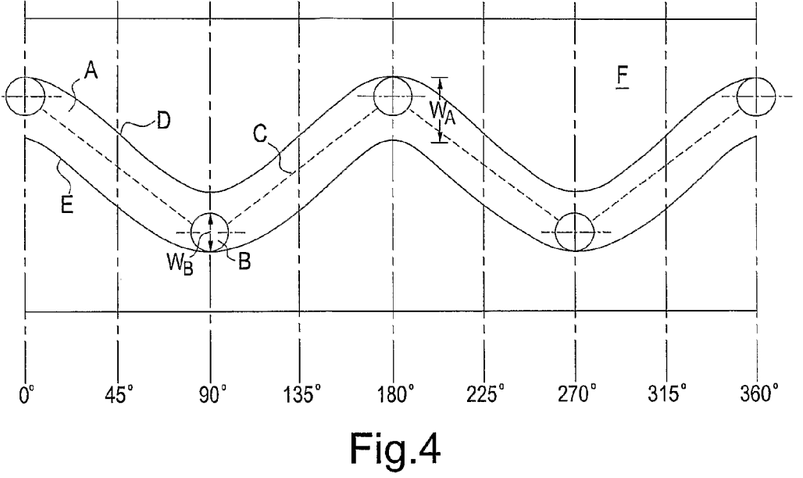
FIG. 4 a cam track and cam follower arrangement comprising part of the tool of FIG. 2, illustrating a path of the cam follower when the tool is not applied to a work surface.

In use, when not placed against a work surface (not shown), the cam follower means B follows a path C dictated substantially only by the cam track A—see FIG. 4.

Figure 5:
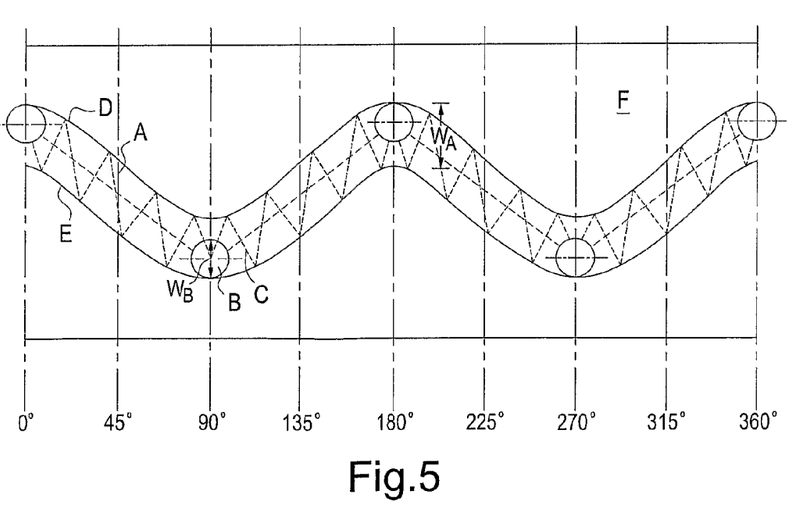
FIG. 5 the cam track and cam follower arrangement of FIG. 4, illustrating a path of the cam follower when the tool is applied to a work surface.

In use, when placed against a work surface, the cam follower means B follows a path C dictated by the cam track A and by ricochet of a tool bit 10 of the tool 5 off the work surface, and/or the cam follower means B off walls of the cam track A—see FIG. 5.

In the latter case the cam follower means B therefore has two degrees of motion, a first degree of motion defined by the cam track A, and a second degree of motion defined by ricochet between opposing walls D, E of the cam track A. The second degree of motion may be termed "chatter".

The first degree of motion has a frequency defined by the cam track A. The second degree of motion has a higher frequency than the frequency of the first degree of motion. The frequency of the second degree of motion typically varies dependent upon the work surface to which the tool 5 is presented. The second degree of motion may therefore be "self-tuning", dependent upon the hardness of the work surface.

The first degree of motion causes a substantially longitudinally throw of a tool bit 10 of the tool 5. The second degree of motion causes a substantially longitudinal vibration or chatter of the tool bit 10 of the tool 5.

The cam track A comprises a closed (circular) track, and is provided on cam cylinder F.

The cam follower means B comprises at least one pin, and in this embodiment at least one pair of opposing pins 15.

Sides or walls D, E of the cam track A are, in this embodiment, substantially parallel. However, in a modification such can be at least non-parallel. The width of the cam track A can be constant or can vary along or around the length thereof.

In this embodiment the cam track A is recessed, and the cam follower means B received therein. Alternatively, in a modification the cam follower means can be recessed, and the cam track received therein.

The cam track A comprises a waveform—in this embodiment sinusoidal. Alternatively, the waveform may be non-sinusoidal.

Peaks and/or troughs of the first cam track wall D can be coincident with or offset from peaks and/or troughs of the second cam track wall E.

The tool 5 is advantageously a power tool or hand-held tool, e.g. a hand-held power tool. The tool 5 can be powered by an external electricity supply, e.g. mains electricity (e.g. 110V/240V) or by a low voltage supply (e.g. 12V), e.g. from a motor vehicle or vessel/boat. Alternatively, the tool may be battery powered.

However, it will be appreciated that in alternative embodiments the tool can be hydraulically powered or pneumatically powered, e.g. by compressed air.

In a particularly advantageous implementation the tool 5 comprises a scraping tool, such as a marine growth or fouling removal tool, barnacle scraper or hull scraper.

The tool 5 comprises at least one tool bit or head operatively connected to one of the at lest one cam track A and the at least one cam follower means B.

The tool 5 further comprises at least rotational drive means operatively connected to the other of the at least one cam tracks A and the at least one cam follower means B.

As will hereinafter be described in greater detail, the tool 5 comprises a housing, a drive means and a mounting arrangement for a tool bit 10, wherein there is provided within the housing an output arrangement adapted to drive an output shaft in a reciprocal axial movement to drive the tool bit 10, and the drive means can be substantially sealed (e.g. against fluid ingress) from external of the tool 5. This allows the tool 5 to be used underwater or in wet/moist environments. In alternative advantageous embodiments the tool 5 comprises a handyman's or tradesman's tool.

The tool 5 can comprise a scraper, paint stripper, wall paper stripper, chisel, cold chisel, power spade, hammer or the like.

In further alternative embodiments the tool can be adapted for use downhole and comprises a downhole tool.

The tool 5 comprises one or more of:
a housing;
a rotary drive means;
a cylinder cam F having the cam track A extending around a circumferential surface thereof;
a mounting arrangement for (releasably holding) a tool bit 10, one of the cam track A and cam follower means B being driven by the drive means;
the mounting arrangement being associated with one of the cam track A and the cam follower means B, such that actuation of the rotary drive means drives reciprocal movement of the mounting arrangement;
at least part of the cam track A being in the form of a wave having an amplitude and a wavelength, the wave having a forward throw section, and a rearward throw section, which, in use, drive the mounting arrangement respectively forward and rearward.

As will be appreciated from the foregoing, the tool 5 comprises a cam track A and cam follower means B, wherein, in use, the cam follower means B has a first degree of movement dictated by movement around the cam track A, and a second degree of movement dictated by movement between walls D, E of the cam track A.

Figure 2:
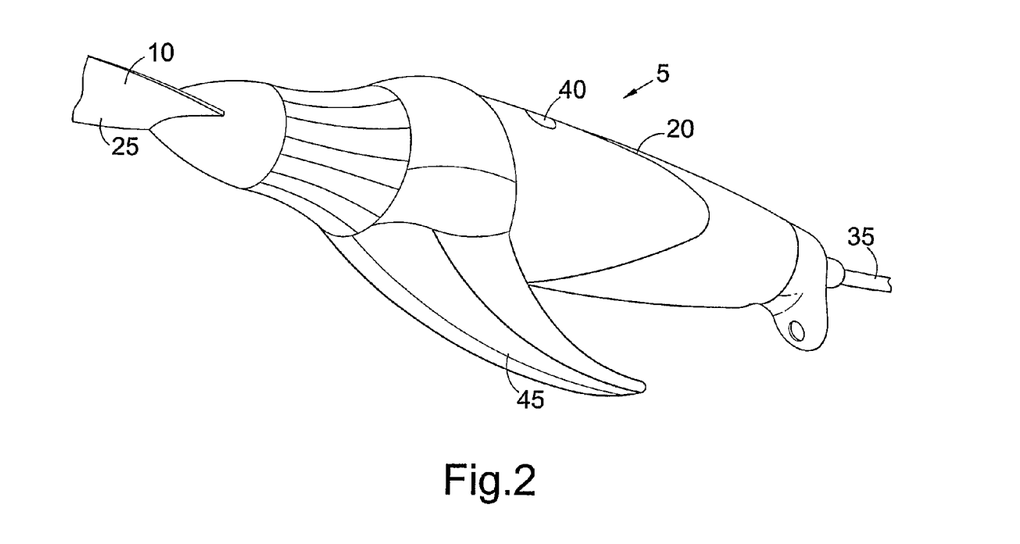
FIG. 2 a perspective view from the front and to one side of a tool according to an embodiment of the present invention.

The tool 5 comprises a plastics housing 20 and tool bit 10 in the form of a scraper blade 25. The blade 25 is mounted on a reciprocating shaft 30, which is powered by an internal motor (described below). One end of a power cable 35 enters the casing 20, while another end leads to a power supply (not shown), for example, a battery located on a boat. The casing 20 also includes an activating button or trigger mechanism 40, which can optionally provide a "dead-man's handle" safety feature, and a hand guard 45, located so as to protect a user's fingers when holding the tool 5.

Figure 3:
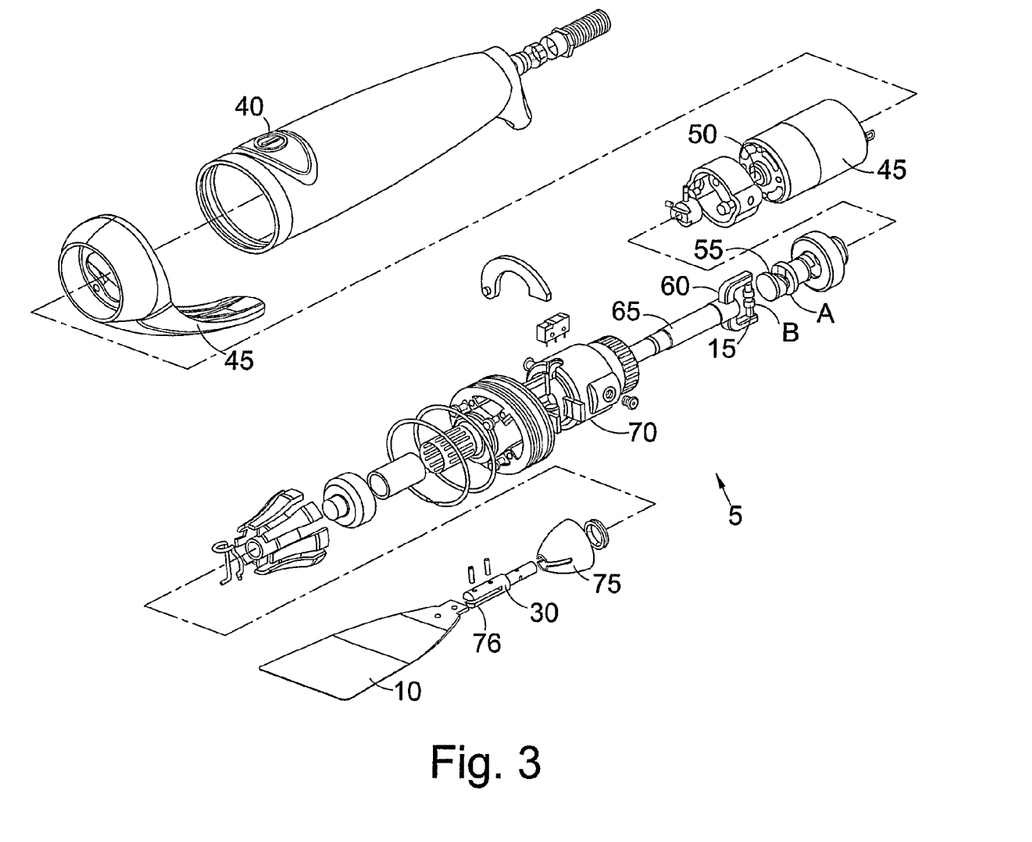
FIG. 3 an exploded perspective view from the front and to one side of the tool of FIG. 2.

Internal components of the tool 5 are shown in the exploded view of FIG. 3.

The power cable 35 leads to a low power rotary motor 45, which drives a rotatable output shaft 50. The motor 45 is "low power" in the sense that a typical motor as used in the present invention run at 12-24V on 2-4 A, as opposed to conventional motors for existing reciprocating power tools, which run at no less than a few hundred Watts.

Mounted on the rotary output shaft 50 is a cylinder cam 55 with circumferentially arranged cam track A—which in this embodiment is substantially sinusoidal.

Received in the cam track A are cam follower means B comprising a pair of pins or studs 15, which are connected via a frame 60 to an output shaft 65. Mounted on the output shaft 65 are a number of parts 70 and a cover 75, which serve to secure the scraper blade 25 to the shaft 65. The tool 5 also comprises a blade holder 76. In certain embodiments of the present invention, a plurality of interchangeable blades 70 can be provided, in order to adapt the tool 5 for use in different applications.

In use, electric rotary motor 45 drives rotary output shaft 50, which in turn rotates cam 55, which bears sinusoidal cam track A.

Pins or studs 15 act as cam follower means B, and are driven in an axially reciprocating motion by the rotational motion of the cam 55, the pins or studs 15 in turn being mounted in frame 60, which is itself connected to tool blade 15 via output shaft 65. The rotary motor 45 is typically capable of driving an axially reciprocating blade 15 at up to 14,000 cycles per minute with relatively little waste heat generated, compared to conventional reciprocal motors.

Thus, the present invention provides a tool 5, which can be sealed from moisture or other hazardous environments, and therefore is suitable for use as a marine growth remover, amongst other applications, the drive means requiring no cooling by means of slots or vents in the housing. Sealing means can be provided as described in WO 01/60594.

Referring now to FIG. 4, the reduced diameter cam follower means B at the limit of their fore and aft travel are catapulted between curved top and bottom sections of the cam track A. In free unloaded conditions the cam follower means B can then describe a straight, or near straight line path C between the extremities of the wave as shown by a dotted line in FIG. 4.

In practise, this has led to the unexpected recognition that the mechanism behaves in a more aggressive way than if the wave shape solely dictated the path of the cam followers B. This increased aggression endows any mechanism that has this effect at its heart with more efficient performance in its field of application.

In a modification, therefore, the wave shape (i.e. walls D, E) can be more closely tailored to the real path C described by the cam follower means B, but still retaining its parallel sided form.

Referring now to FIG. 5, the cam track A and cam follower B arrangement is not always to be run in free and unloaded conditions. An example of this is the WAVEBLADE™ marine fouling removal tool. The cam mechanism drive blade 15, which efficiently removes fouling which is very hard in nature and rigidly adhered to the surface, which is or has been in contact with or exposed to the sea. Against such a surface, the blade 15 inevitably transmits shocks back through the mechanism. This results in the reduced diameter cam follower means B rebounding or ricocheting from one side wall D of the wave to the other side wall E whilst in transit through the reciprocal path C imparted to the cam follower means B by the wave shape. Dependent upon the nature of the work surface and the pattern of contact the mechanism has with it, the true path C of the cam follower means B can vary considerably as illustrated in FIG. 5. The pattern of movement shown in FIG. 5 is regular, but in practise, the pattern will likely be very varied as described above and may be anything but regular.

Figure 6:
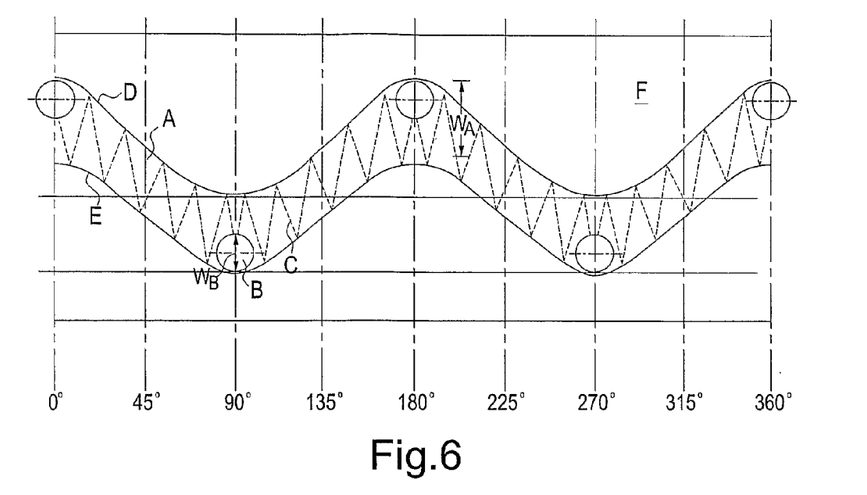
FIG. 6 a first alternative cam track and cam follower arrangement illustrating a path of the cam follower when the tool is applied to a first work surface.

Referring now to FIG. 6, there is shown a first alternative cam track A and cam follower B arrangement. The arrangement is similar to the arrangements of FIGS. 4 and 5, like parts being designated by like letters.

In this arrangement, walls D, E of the cam track A are non-parallel, being wider apart at the peaks and troughs of the waveform.

Figure 7:
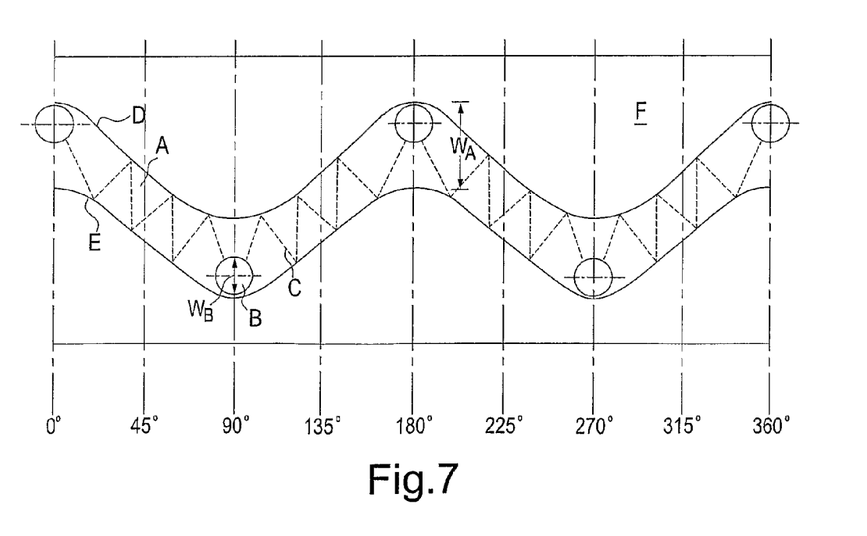
FIG. 7 the first alternative cam track and cam follower arrangement of FIG. 6 illustrating a second path of the cam follower when the tool is applied to a second work surface.

The path C of the cam follower B when the tool 5 is presented to a first given work surface is shown in FIG. 6. The path C of the cam follower B when the tool 5 is presented to a second given work surface is shown in FIG. 7. The path C of the cam follower B when the tool is presented to a third given work surface is shown in FIG. 8.

Referring again to FIGS. 6, 7 and 8, the wave of the cam track A has side walls D, E that are at least partly not parallel, but deliberately varied one from the other. In this case the cam track A is wider at the peak and trough portions. This may well have the effect of inducing variations into the ricocheting action that enhance the performance of the mechanism or change its characteristic for the better.

Figure 8:
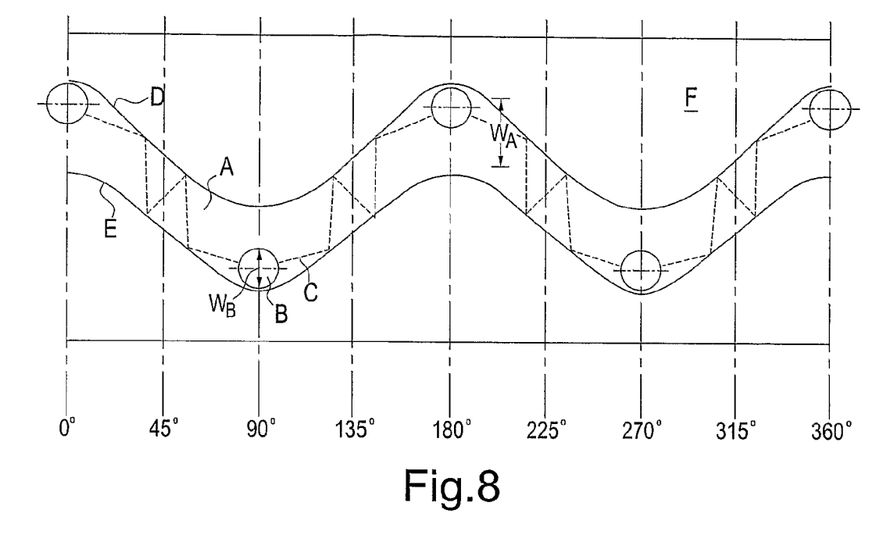
FIG. 8 the first alternative cam track and cam follower arrangement of FIG. 6 illustrating a path of the cam follower when the tool is applied to a third work surface.

The illustrations shown in FIGS. 6, 7 and 8 are meant to convey the concept, not the actuality of the movement as many variations will occur in practise as earlier described above.

Figure 9A:
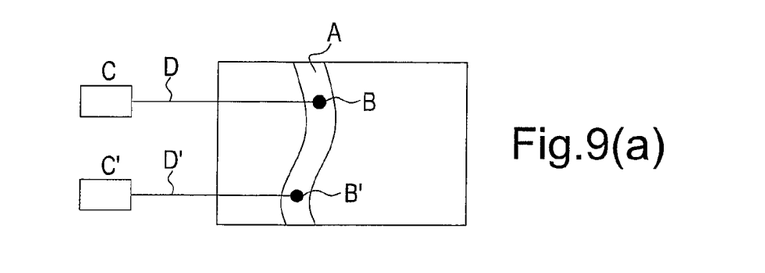
Figure 9B:
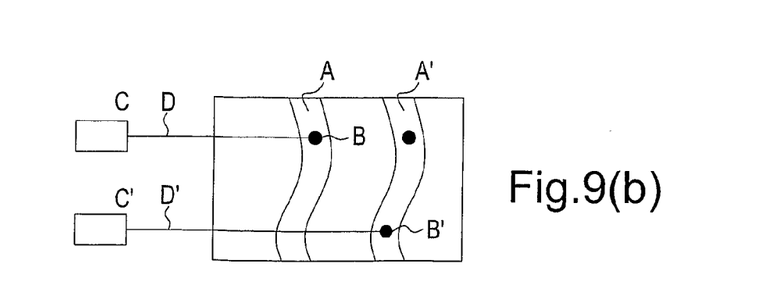

Referring now to FIGS. 9(a) and 9(b), in a further alternative embodiment the tool 5 comprises at least first follower means A and at least one further cam follower means B.

In such case the tool 5 comprises a first respective tool bit or head C, e.g. connected to the at least first cam follower means B, e.g. by means of a respective connection means such as a shaft D.

In such case the tool 5 comprises at least one further respective tool bit or head C, e.g. connected to the one of the at least one further cam follower means B, e.g. by means of connection means such as a shaft D.

In one version (FIG. 9(a)) of the alternative embodiment the at least first cam follower means B and at least one of the at least one further cam follower means B are associated with (e.g. in use, run around) the at least one cam track A.

In another version (FIG. 9(b)) of the alternative embodiment the at least first cam follower means B is associated with one of the at lest one cam tracks A and at least one of the at lest one further cam follower means B is associated with another of the at least one cam tracks A.

In the one version (FIG. 9(a)) and the another version (FIG. 9(b)) the at least one cam follower means B and the at least one further cam follower means B can be substantially the same, though, e.g. provided rotationally separate from one another. In this way the cam follower means B and further at least one follower means B can, in use, impart substantially the same movement to a respective tool bit C and further tool bit C, though e.g. out of phase with one another, e.g. 90° or 180° out of phase.

Alternatively in the one version FIG. 9(a) and the another version FIG. 9(b) the at least one cam follower means B and the at least one further cam follower means B can be different, e.g. in size. Though, e.g. provided rotationally separate from one another. In this way the at least one cam follower means B and further at least one cam follower means B may, in use, impart different movements to a respective tool bit C and further tool bit C. By such arrangement, in use, the tool bit C can impact or work upon a work surface in one way and the further tool bit C impact or work upon the work surface in another way.

In the another version (FIG. 9(b)) the at least one cam track A and one other at least one cam track A can be substantially the same, though optionally out of phase with one another, and at least one further cam follower means B can be rotationally separate or coincident. By such arrangement, in use, a tool bit C of the at least one cam follower means B and tool bit C of the at least one further cam follower means B can be caused to move in a same fashion or manner though, e.g. out of phase with one another.

In the another version (FIG. 9(b)) the at least one cam track A and the another at least one cam track A can be substantially different. The at least one cam follower means B and at least one further cam follower means B can be rotationally separate or coincident. Further the at least one cam track A and the another at least one cam track D can be in phase or out of phase with one another. By such arrangement, in use, a tool bit C of the at least one cam follower means B and tool bit C of the at least one further cam follower means B can be caused to move in a different fashion or manner, whether out of phase or in phase with one another.

It will be appreciated that the embodiments of the present invention hereinbefore described are given by way of example only, and are not meant to be limiting to the scope of the invention. As a non-limiting example the first degree of motion (longitudinal throw) of a tool bit of a tool of the present invention may typically operate at a frequency of the order of 5,000 to 10,000 cycles per minute. The second degree of motion (chatter) of the cam follower means and therefore the tool bit typically may be of the order of 10 to 20 times the frequency of the first degree of motion.

The invention claimed is:

1. A tool comprising a cam track and cam follower means, wherein the cam track and cam follower means are engaged with one another, and the tool comprises at least one tool bit or head operatively connected to one of the at least one cam track and the at least one cam follower means, and at least one rotational drive means operatively connected to the other of the at least one cam track and the at least one cam follower means, and wherein a width of at least a portion of the cam track is greater than a width of the cam follower means and the width of the cam follower means is less than 90% of the width of the at least a portion of the cam track such that, in use, the cam follower means has two degrees of longitudinal motion, a first degree of motion defined by the cam track, and a second degree of motion defined by ricochet between opposing walls of the cam track wherein the first degree of motion has a frequency defined by the cam track, and the second degree of motion has a higher frequency than the frequency of the first degree of motion.

2. A tool as claimed in claim 1, wherein the cam follower means and cam track are a loose fit relative to one another.

3. A tool as claimed in claim 1, wherein the cam follower means is adapted to run in the cam track, such as move around the cam track, and be thrown between opposing walls of the cam track.

4. A tool as claimed in claim 1, wherein, in use, when not placed against a work surface the cam follower means follows a path dictated substantially only by the cam track.

5. A tool as claimed in claim 1, wherein the cam track and cam follower means are such that, in use, when not placed against a work surface the cam follower means travels in a substantially straight path from one trough on one wall of the cam track to another trough on another wall of the cam track, optionally without intermediately striking the walls of the track.

6. A tool as claimed in claim 1, wherein in use, when placed against a work surface the cam follower means follows a path dictated by the cam track and by one or both of ricochet of the tool off the work surface and the cam follower means off walls of the cam track.

7. A tool as claimed in claim 1, wherein the first degree of motion causes a substantially longitudinally throw of a tool bit of the tool, and/or the second degree of motion causes a substantially longitudinal vibration or chaffer of the tool bit of the tool.

8. A tool as claimed in claim 1, wherein the width of the cam follower means is less than the width of the entire cam track.

9. A tool as claimed in claim 1, wherein the cam track comprises a closed/circular track and is provided on a cam cylinder.

10. A tool as claimed in claim 1, wherein the cam follower means comprise at least one pin.

11. A tool as claimed in claim 1, wherein sides or walls of the cam track are substantially parallel.

12. A tool as claimed in claim 1, wherein the width of the cam track is constant around the length thereof.

13. A tool as claimed in claim 1, wherein the width of the cam track is substantially constant along or around the length thereof.

14. A tool as claimed in claim 1, wherein the width of the cam track is greater at one or both of a portion adjacent peaks a portion adjacent troughs than at a portion of the cam track between the peaks and troughs.

15. A tool as claimed in claim 1, wherein the cam track is recessed, and the cam follower means received therein.

16. A tool as claimed in claim 1, wherein the cam follower means is recessed or comprise at least first and second spaced members or portions, and the cam track received therein, there optionally being provided at least two pairs of opposing first and second members.

17. A tool as claimed in claim 1, wherein the cam track comprises a waveform.

18. A tool as claimed in claim 1, wherein one or both of peaks and troughs of a first cam track wall are coincident with or offset from one or both of peaks and troughs of a second cam track wall.

19. A tool as claimed in claim 1, wherein the tool is selected from one of: a power tool, a hand-held tool or a hand-held power tool.

20. A tool as claimed claim 1, wherein the tool is powered by a power supply selected from one of: an external electrical supply, a mains electricity supply, a low voltage supply, a motor vehicle or vessel/boat supply.

21. A tool as claimed in claim 1, wherein the tool is battery powered.

22. A tool as claimed in claim 1, wherein the cam track or the cam follower means is rotationally driven by rotational drive means, such as an electric motor.

23. A tool as claimed in claim 1, wherein the tool comprises a marine growth removal or anti-fouling tool, such as a barnacle scraper or hull scraper.

24. A tool as claimed claim 1, wherein a drive means and a mounting arrangement for a tool bit, wherein there is provided within the housing an output arrangement adapted to drive an output shaft in a reciprocal axial movement to drive the tool bit, and the drive means may be substantially sealed such as against fluid ingress) from external of the tool.

25. A tool as claimed in claim 1, wherein the tool comprises a handyman's or tradesman's tool.

26. A tool as claimed in claim 1, wherein the tool comprises a scraper, paint stripper, wall paper stripper, chisel, cold chisel, power spade or hammer.

27. A tool as claimed in claim 1, wherein the tool comprises a downhole tool.

28. A tool as claimed in claim 1, wherein the tool comprises one or more of:
a housing;
a cylinder cam having the cam track extending around a circumferential surface thereof;
a mounting arrangement for a tool bit, one of the cam track and cam follower means being driven by the drive means;
the mounting arrangement being associated with one of the cam track and the cam follower means, such that actuation of the rotational drive means drives reciprocal movement of the mounting arrangement;
at least part of the cam track being in the form of a wave having an amplitude and a wavelength, the wave having a forward throw section, and a rearward throw section, which, in use, drive the mounting arrangement respectively forward and rearward.

29. A tool as claimed in claim 1, wherein there are provided a plurality of interchangeable tool bits.

30. A tool as claimed in claim 1, wherein the tool is electrically powered by mains supply, an external electricity supply or by battery, or is hydraulically powered, or is pneumatically powered.

31. A tool as claimed in claim 1, wherein the tool comprises at least one tool bit or head operatively connected to one of the at least one cam track and the at least one cam follower means, and the tool further comprises rotational drive means operatively connected to the other of the at least one cam track and the at least one cam follower means.

32. A tool as claimed in claim 1, wherein the tool comprises at least first cam follower means and at least one further cam follower means.

33. A tool as claimed in claim 32, wherein the tool comprises a first respective tool bit or head connected to the at least first cam follower means, by means of a respective connection means and at least one further respective tool bit or head, connected to the one of the at least one further cam follower means by means of respective cam follower means.

34. A tool as claimed in claim 32, wherein the at least first cam follower means and at least one of the at least one further cam follower means are associated with, in use, the one of the at least one cam tracks.

35. A tool as claimed in claim 32, wherein the at least first cam follower means is associated with one of the at least one cam tracks and at least one of the at least one further cam follower means is associated with another of the at least one cam tracks.

36. A tool as claimed in claim 32, wherein the at least one cam follower means and the at least one further en follower means are substantially the same, though, optionally provided rotationally separate from one another such that the at least one cam follower means and further at least one cam follower means, in use, impart substantially the same movement to a respective tool bit and further tool bit, though optionally out of phase with one another.

37. A tool as claimed in claim 32, wherein the at least one cam follower means and the at least one further cam follower means are different in size such that the at least one cam follower means and further at least one cam follower means, in use, impart different movements to a respective tool bit and further tool bit.

38. A tool as claimed in claim 32, wherein the at least one cam track and the another at least one cam track are substantially the same, the at least one cam follower means and at least one further cam follower means being rotationally separate or coincident.

39. A tool as claimed in claim 32, wherein the at least one cam track and the another at least one cam track are substantially different, the at least one cam follower means and at least one further cam follower means being rotationally separate or coincident, and further the at least one cam track and the another at least one cam track being in phase or out of phase with one another.

\* \* \* \* \*